United States Patent
Schmitt et al.

(10) Patent No.: US 7,049,950 B2
(45) Date of Patent: May 23, 2006

(54) METHOD AND DEVICE FOR AUTOMATIC CONTROL OF ILLUMINATION DEVICES

(75) Inventors: Patrick Schmitt, Lichtenau (DE); Norbert Hog, Buehl (DE); Bruno Hodapp, Achern-Oensbach (DE); Gebhard Michenfelder, Lichtenau (DE); Hans Meier, Ottersweier (DE); Henry Blitzke, Buehl (DE); Andreas Schneider, Buehl (DE); Pierre Nonnnenmacher, Niederschaeffolsheim (FR)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 10/473,764

(22) PCT Filed: Dec. 29, 2001

(86) PCT No.: PCT/DE01/04945

§ 371 (c)(1),
(2), (4) Date: Oct. 1, 2003

(87) PCT Pub. No.: WO02/081260

PCT Pub. Date: Oct. 17, 2002

(65) Prior Publication Data

US 2004/0114380 A1    Jun. 17, 2004

(30) Foreign Application Priority Data

Apr. 3, 2001    (DE)    ................. 101 16 490

(51) Int. Cl.
*B60Q 1/26* (2006.01)

(52) U.S. Cl. ............ 340/468; 307/10.8; 315/82; 315/149; 340/309.16

(58) Field of Classification Search ........... 340/469, 340/600, 602, 540, 425.5, 309.16, 468; 250/214 AL; 307/10.8; 361/173, 175; 315/82, 83, 149, 315/150, 152, 155, 158, 159
See application file for complete search history.

(56) References Cited

U.S. PATENT DOCUMENTS

| 3,829,828 | A |   | 8/1974  | Hutchinson |
| 4,236,099 | A | * | 11/1980 | Rosenblum ............... 315/83 |
| 4,613,791 | A | * | 9/1986  | Kurihara et al. ........... 315/82 |
| 5,187,383 | A |   | 2/1993  | Taccetta |
| 5,812,321 | A | * | 9/1998  | Schierbeek et al. ........ 359/601 |
| 6,161,065 | A | * | 12/2000 | Kamishima et al. ........ 340/469 |

FOREIGN PATENT DOCUMENTS

| DE | 35 03 451 | 8/1985  |
| EP | 1 006 020 | 6/2000  |
| GB | 2 204 946 | 11/1988 |
| GB | 2 312 504 | 10/1997 |

* cited by examiner

*Primary Examiner*—Thomas Mullen
(74) *Attorney, Agent, or Firm*—Kenyon & Kenyon

(57) ABSTRACT

A method and an apparatus for automatic control of illumination devices, in particular of a motor vehicle, include a brightness sensor which delivers first signals, the illumination devices are switched off after a time interval that begins at the point in time at which the first signals exceed or fall below a first threshold. The length of the time interval is modifiable, and in particular, is capable of being extended.

9 Claims, 1 Drawing Sheet

METHOD AND DEVICE FOR AUTOMATIC CONTROL OF ILLUMINATION DEVICES

FIELD OF THE INVENTION

The invention relates to a method and an apparatus for automatic control of illumination devices.

BACKGROUND INFORMATION

German Published Patent Application No. 35 03 451 refers to a device having a sensor device which encompasses several sensors with which light conditions in the vicinity of the vehicle are sensed. The sensor device is connected to an evaluation device in which, from the signals of the sensor device, a determination is made as to whether a change in the switching state of the illumination devices is necessary given the current light conditions in the vicinity of the vehicle. This device may provide automatic switching of the illumination devices, i.e. headlights and tail lights, of the vehicle as general light conditions change, but certain changes in the light conditions in the vicinity of the vehicle cannot or may not be detected by the device.

In difficult light conditions in particular, for example at twilight, the illumination devices may be unfavorably switched off.

SUMMARY OF THE INVENTION

With the method according to the present invention, the length of the time interval that must elapse after a brightness change in order to switch off the illumination devices is modifiable. Improved behavior of the illumination devices, in particular in difficult light conditions in the borderline region between day and night, i.e. at twilight, is thereby achieved. In these situations it is particularly important that in a context of changing light conditions, for example when traversing bridges and tunnels, the illumination devices remain switched on, and that a troublesome "blinking light" effect nevertheless be avoided. The latter would be irritating to other road users, and moreover reduces the service life of the headlights, tail lights and other illumination devices.

A further advantage may result when the illumination devices remain switched on for a longer time even though the ambient brightness would no longer require it. This corresponds to a longer post-illumination time for the illumination devices, for example at twilight when the sun is low.

It may be particularly advantageous if the length of the time interval is modifiable as a function of the first signals delivered by the brightness sensor. Brightness changes or even specific effects, for example an artificial light source that has been detected, can thus directly influence the time interval.

It may be particularly advantageous in this context if the state of twilight is detected, and in the event twilight has been detected, the time interval is selected to be longer than in the event twilight is not detected. This is advantageous in particular because, for example, in the morning when the sun is rising, it is better for the illumination devices to remain switched on for a longer time than at midday in bright sunlight, in order to increase safety.

It may be particularly advantageous in this context if twilight is detected by the fact that the first signals of the brightness sensor lie within a signal magnitude window during a further time interval. This allows the conclusion that the brightness is changing only slowly, which may be an indication of the presence of twilight.

The signal magnitude window may be constituted by the first threshold that influences the switching-off time, and a second threshold that influences the switching-on time. A different signal magnitude window, in particular a smaller one, may be used.

It may be particularly advantageous if the time count of the time interval is interrupted if the first signals, after a shortfall which triggers initiation, once again briefly exceed the first threshold. This may be an advantage in particular because in this fashion, brief brightness changes such as those possible, for example, with direct sun irradiation at twilight are taken into account without resetting the time interval back to the normal time interval.

It may be further advantageous if the time interval is reset back to the extended time interval if the switching-on threshold, constituting the second threshold, is once again exceeded. It is then assumed that only a brief darkness event, for example passage under a bridge, has occurred, which does not change the underlying illumination situation (e.g. twilight). Upon a subsequent shortfall below the first threshold, the entire extended time interval is thus observed until the illumination devices are switched off, instead of the extended time interval already shortened by the interruptions.

The apparatus according to the present invention described herein may have the advantage that, especially in phases of difficult light conditions, it switches the illumination devices off again at an optimum point in time after being switched on.

It may be particularly advantageous in this context if the control device is embodied in such a way that it modifies the length of the time interval as a function of the first signals in order to ascertain an optimum switching-off time for the illumination devices, in particular when characteristic brightness states, for example tunnel traversing or the like, are detected.

In addition, it may be advantageous if the apparatus has a clock-timed counter which begins to count at time T1 when the first signals fall below the first threshold, stops at a subsequent exceedance above the first threshold, and continues counting again upon another shortfall below the first threshold until the time interval defined before time T1 has elapsed, whereupon the illumination devices are switched off and the counter is reset to the normal time interval and, if the further threshold is prematurely exceeded, is reset to the entire extended time interval.

DETAILED DESCRIPTION

Figure 1:
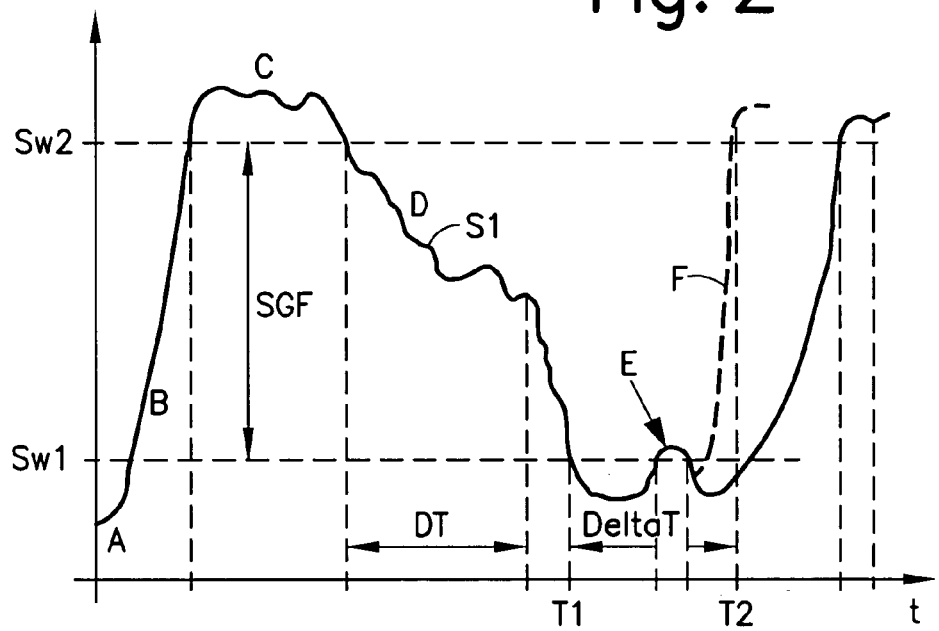
FIG. 1 shows a typical profile of S1 over time.

FIG. 1 depicts an example profile of first signals S1 while driving. In a first segment A, illumination devices 14 are switched off because sufficient ambient brightness is present. In second segment B, the ambient brightness drops suddenly and rapidly, as may be the case e.g. when driving into a tunnel. At the point in time at which first signals S1 exceed a second threshold SW2, for example 1000 lux, illumination devices 14 are switched on. In a third region C, there is little change in the ambient brightness, so illumination devices 14 remain switched on. In a subsequent region D, the ambient brightness, and thus signal S1, rises again. This is the case, for example, when driving out of a tunnel and when, at twilight, only a small amount of light is incident on brightness sensor 28. After the value falls below second threshold SW2, a check is made as to whether first signals S1 lie within a signal magnitude threshold SGF during further time interval DT. If that is the case, time interval DeltaT is extended to, for example, approximately 255 seconds, since an 8-bit variable can then be occupied. This interval is normally, for example, approximately 5 seconds, which will be referred to hereinafter as the "normal time interval." This normal time interval is therefore the interval after which illumination devices 14 are switched off after a sudden brightness change, i.e. if a special state such as twilight, rain, or fog is not detected.

If the brightness subsequently increases again, time interval DeltaT (after the expiration of which illumination devices 14 will be switched off) begins to run at the point in time at which first signals S1 fall below a first threshold SW1, for example 3500 lux. In this region DeltaT, first signals S1 may also in turn exceed first threshold SW1, as shown in segment E. During this time, the time count of time interval DeltaT is suspended. After the expiration of DeltaT, illumination devices 14 are switched off at time T2. If second threshold SW2 is exceeded, as shown in region F, before time interval DeltaT has elapsed (i.e. before time T2), illumination devices 14 then remain switched on. Time interval DeltaT then remains extended, but is reset back to the beginning, so that in the event of another shortfall below first threshold SW1, illumination devices 14 are switched off only after the entire extended time interval DeltaT has elapsed.

In this FIG. 1, a higher value of first signals S1 corresponds to a lower ambient brightness. In the converse case, the terms "exceed" and "fall below" are of course interchanged.

Figure 2:
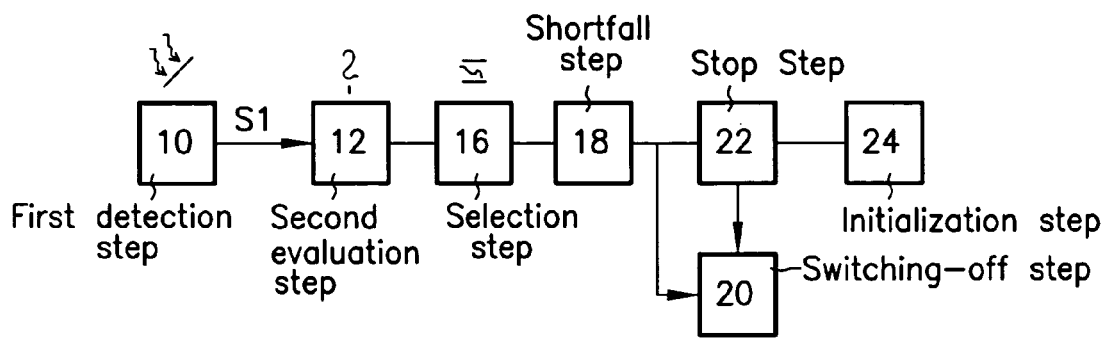
FIG. 2 shows the method according to the present invention.

The exact process sequence is depicted again in FIG. 2. In a first detection step 10, the ambient brightness is sensed and first signals S1 are generated. In a second evaluation step 12, first signals S1 are evaluated and, for example, illumination devices 14 are switched on. Then, in a selection step 16, the subsequent profile of first signals S1 is observed, checking in particular as to whether they lie within a signal magnitude window SGF during further time span DT. Time interval DeltaT is selected as a function of this comparison result.

If first signals S1 drop below a first threshold SW1, time interval DeltaT then begins to run in this shortfall step 18. If first signals S1 remain below first threshold SW1 during the entire time interval DeltaT, illumination devices 14 are then, in a switching-off step 20, switched off at time T2 after time interval DeltaT has elapsed, and time interval DeltaT is reset to the normal time interval.

If, however, first signals S1 exceed first threshold SW1 before time interval DeltaT has elapsed, the time count is then halted interrupted in a stop step 22, and is resumed again only when first signals S1 once again fall below first threshold SW1. At time T2 at which time interval DeltaT has elapsed, in switching-off step 20 illumination devices 14 are once again switched off and time interval DeltaT is reset to the normal time interval.

If, before time interval DeltaT has elapsed, the ambient brightness decreases sufficiently and first signals S1 therefore increase sufficiently that they exceed second threshold SW2, illumination devices 14 then remain switched on, and the extended time interval DeltaT is reset, in an initialization step 24, to the beginning of the extended time interval DeltaT.

Figure 3:
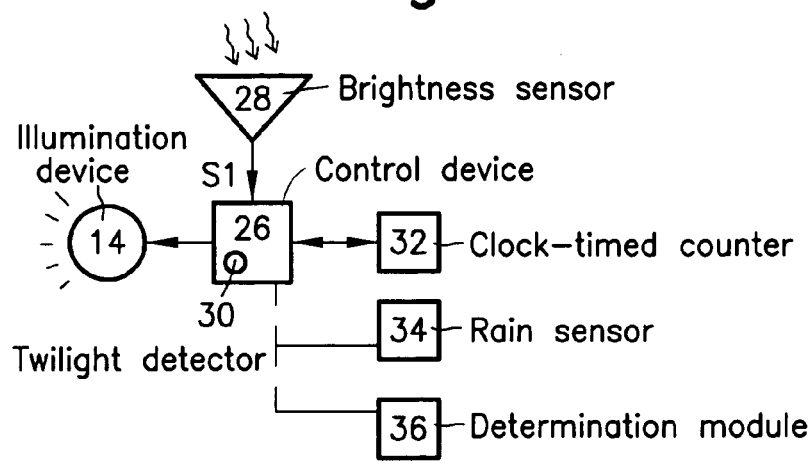
FIG. 3 shows an apparatus according to the present invention.

FIG. 3 schematically depicts an apparatus according to the present invention. Illumination devices 14 are controllable by a control device 26. This control device 26 receives signals S1 of a brightness sensor 28 and processes them in accordance with the method according to the present invention. For that purpose, control device 26 has a twilight detector 30. Control device 26 is furthermore connected to a clock-timed counter 32. This clock-timed counter 32 is initialized with defined time interval DeltaT after further time interval DT has elapsed, and is started by control device 26 at time T1. After this start action, control device 26 can also cause counter 32 to stop temporarily and begin counting again. Counter 32 is typically set by the control device to a value, for example 5. The counter decrements that value at one-second intervals until the value 0 is reached. At that time T2, illumination devices 14 are switched off by control device 26.

In a variation, the extended time interval DeltaT can also be completely reset, i.e. reset to the normal time interval, when second threshold SW2 is exceeded.

The time interval DeltaT may be modified by way of other influencing variables. Explicit mention may be made at this juncture of a rain sensor 34 which detects heavy rain and extends time interval DeltaT when it is present. For example, illumination devices 14 can be switched on as soon as rain sensor 34 activates a continuous wiper mode of a windshield wiper apparatus and the ambient brightness falls below a specific value. This can also occur with a time delay in order to prevent a "blinking light" effect, so that the illumination devices are not activated until the windshield wiper apparatus has already been in operation for a certain time, for example 10 seconds. In that case time interval DeltaT can then be extended. Time interval DeltaT preferably begins when the windshield wiper apparatus establishes its continuous wiping mode.

Several time intervals DeltaT differing from one another can also, of course, be provided, each being set differently depending e.g. on the wiper mode (interval, level I, or level II).

In a variation, the counter can also be reset or halted if rain begins again before time interval DeltaT has elapsed, i.e. if a wiper mode is once again enabled by rain sensor 34.

Likewise, for example, a position determination module 36 can determine the location of the motor vehicle e.g. with the aid of a GPS system, and modify the time interval on the basis of that information.

The time interval can also be modified by broadcast signals, in particular weather data, or by way of a twilight function determined from location and time.

All these components may be incorporated into a single module which can be positioned, for example, on the windshield or rear window of a motor vehicle, or they may be integrated into a navigation system, so that map information can also be employed for modification of the time interval. The information may also be conveyed to further components present in the motor vehicle, such as the central electronics unit, braking system, vehicle dynamics control system, brake assistant, or engine controller. In particular, the apparatus can have a CAN bus interface.

Thresholds SW1 and SW2 and signal magnitude window SGF can, of course, also be embodied in such a way that they can be adjusted by way of an adjusting device, for example a potentiometer or a specific open- or closed-loop control device, at any time (including while driving).

What is claimed is:

1. A method for automatically controlling an illumination device of a motor vehicle, comprising:
   delivering a first signal to a brightness sensor;
   switching off the illumination device after a time interval that begins at a point in time at which the first signal one of falls below and exceeds a first threshold, wherein a length of the time interval is modifiable, wherein the length of the time interval is modifiable as a function of the first signal.

2. The method of claim 1, wherein the length of the time interval is extendable.

3. The method of claim 1, wherein the time interval is selected to be longer during twilight than at another time of day or night.

4. The method of claim 1, wherein the time interval is extended by comparison to a normal time interval when the first signal lies within a signal magnitude window during a further time interval.

5. The method of claim 4, wherein the signal magnitude window is constituted by the first threshold and at least one of a second threshold and a switching-on threshold.

6. The method of claim 1, wherein a time count of the time interval is halted if the first signal once again one of exceeds and falls below the first threshold.

7. The method of claim 6, wherein the time interval is reset back to an entire extended time interval if a second threshold is one of exceeded and fallen below, and is reset to a normal time interval if the illumination device is switched off.

8. An apparatus for automatically controlling illumination devices, comprising:
   at least one brightness sensor to receive first signals; and
   a control device to switch off at least one of the illumination devices after a time interval, and begins the time interval at a point in time when the first signals one of fall below and exceed a first threshold, wherein a length of the time interval is modifiable, wherein the control device provides that the length of the time interval is modifiable as a function of the first signals.

9. The apparatus of claim 8, further comprising: a clock-timed counter to provide a time count within the time interval, wherein the control device provides that the counter begins to count at the point in time, stops when the first signals again exceed or fall below the first threshold, continues counting when the first threshold is again one of fallen below and exceeded, respectively, and is reset to an entire extended time interval if a further threshold is exceeded and fallen below.

* * * * *